Dec. 4, 1928.  H. A. TUTTLE  1,694,294

REVERSING MECHANISM

Filed Jan. 7, 1927  3 Sheets-Sheet 3

Inventor,
Henry A. Tuttle

Patented Dec. 4, 1928.

1,694,294

UNITED STATES PATENT OFFICE.

HENRY A. TUTTLE, OF UPTON, MASSACHUSETTS.

REVERSING MECHANISM.

Application filed January 7, 1927. Serial No. 159,543.

This invention relates to reversing gearing of the type comprising aligned driving and driven shafts, a casing enclosing the proximate ends of said shafts and rotatable thereabout, spur gears fixed to the proximate ends of said shafts, pinion gears carried by the casing in engagement with said spur gears, brake mechanism to secure reverse drive comprising means to hold the casing stationary, and clutch mechanism to secure forward drive comprising means to clutch the casing for rotation with the shafts.

This type of reversing mechanism is well known in the art and is very satisfactory with the exception that there is a tendency for some shaking or vibration between the driving and driven shafts when in forward drive, the shaking being permitted since the forward drive is through the teeth of the locked gears which necessarily have some clearance or play between them. To do away with this shaking or play the casing has been provided with clutch mechanisms to clutch the casing with each shaft for forward drive; and the two sets of clutch mechanisms are adapted to be operated simultaneously to set the gearing mechanism for forward drive. The simultaneous actuation of the two clutch mechanisms, without involving a complicated clutch operating mechanism or without impairing the efficiency, reliability and long life of the gearing mechanism, presents considerable difficulty; and it is an object of this invention to provide a simple and reliable type of operating mechanism adapted to operate both sets of clutches simultaneously without impairing the service that may be expected from the gearing mechanism.

A further object is generally to improve the construction and operation of reversing gearings.

Fig. 5 is a fragmentary section of the enclosing casing and the clutch plates taken between the pinion gears of the casing and illustrating particularly the thrust pins for transmitting the clutching pressure between the clutch mechanisms.

Fig. 6 is a fragmentary side view showing the manner of connecting the clutch plates with the enclosing casing and with a shaft.

Fig. 7 is a plan detail partly broken away and illustrating the spur gears on the aligned shafts and the manner of supporting said shafts in alignment.

Figure 1:
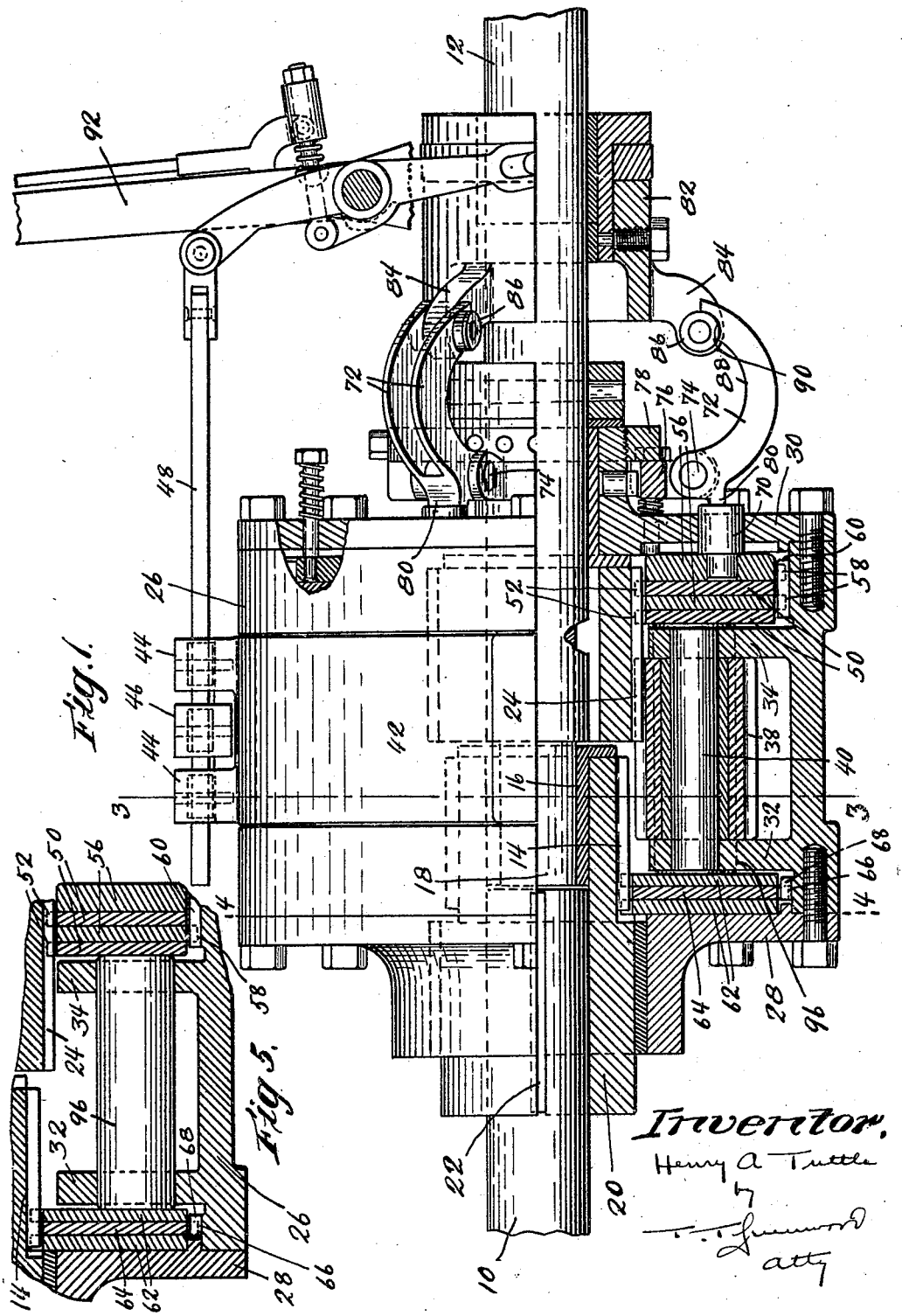
Fig. 1 is a side elevation partly in section of a reversing gearing embodying the invention, the clutch mechanisms being shown in engaged condition.

The gearing mechanism here shown as embodying the invention includes the driving shaft 10 and a driven shaft 12. The driving shaft has the gear 14 fixed thereon which extends forwardly beyond the end of the driven shaft and has a bushing 16 therein in which the reduced end 18 of the driven shaft is rotatably received whereby to support the two shafts in axial alignment. Said gear 14 is provided with an enlarged hub 20 in the rear of the gear teeth, which hub is fixed to the driving shaft by the key 22. The driven shaft is provided with a spur gear 24 fixed thereon at its end proximate to the end of the driving shaft. A cylindrical casing or drum 26 is disposed about the proximate ends of said shafts and the gears thereon and is rotatable on and about said shafts. Said casing is provided with a pair of end plates or walls 28 and 30 respectively. Said end plate 28 has a bearing on the hub 20 of said spur gear 14 and said end plate 30 has a bearing on said driven shaft 12. Said casing is provided with a pair of radially inwardly extended flanges or ribs 32 and 34 respectively which are spaced from each other and from the end walls 28 and 30 respectively.

A plurality of sets of intermeshing pinion gears 36 and 38 are freely rotatable on pins 40 which are extended between and have their ends received in and supported by the flanges 32 and 34 in parallel relation with each other and with the driving and driven shafts. Said gears 36 are larger than their intermeshing gears 38 and are in constant mesh with the driving spur gear 14. Said small pinion gears 38 are in constant mesh with the driven gear 24.

Brake mechanism is provided to hold said casing 26 stationary and thereby effect the reverse rotation of said driven shaft 12 through the intermeshing gears from the driving shaft. The brake mechanism includes a flexible brake band 42 which encircles said casing 26 and is adapted to have its proximate ends 44 and 46 drawn together by suitable cam mechanism well known in the art actuated by the operating rod 48.

In accordance with this invention, the casing 26 is adapted to be clutched to both the driving and the driven shafts to secure forward drive. For this purpose, the clutch mechanism comprises two clutch sections; one section of which is contained in the annular space between the casing wall 30 and the flange 34 and the other section of which is contained in the annular space formed between the casing wall 28 and the casing flange 32. The right hand clutch section comprises a set of clutch plates 50, the inner peripheries of which are formed with internal gear teeth 52 that mesh with the gear teeth of the driven spur gear 24 and are adapted to slide axially along said gear while maintaining driving connection therewith. Said clutch section also comprises a cooperating set of clutch plates 56 which are intermeshed with said plates 50 and have external gear teeth 58 formed on their outer peripheries that mesh with internal gear teeth 60 formed in the inner periphery of the casing 26 and are adapted to slide axially along said internal gear teeth while maintaining driving relation therewith. The left hand clutch section similarly comprises a set of clutch plates 62 having internal gear teeth meshing with and slidable along the driving spur gear 14 and one or more cooperating clutch plates 64 having external gear teeth 66 meshing with the internal gear teeth 68 formed in the inner periphery of the casing. Both clutch sections are adapted to be set at the same time whereby to clutch the casing simultaneously with the driving and driven shafts.

Figure 2:
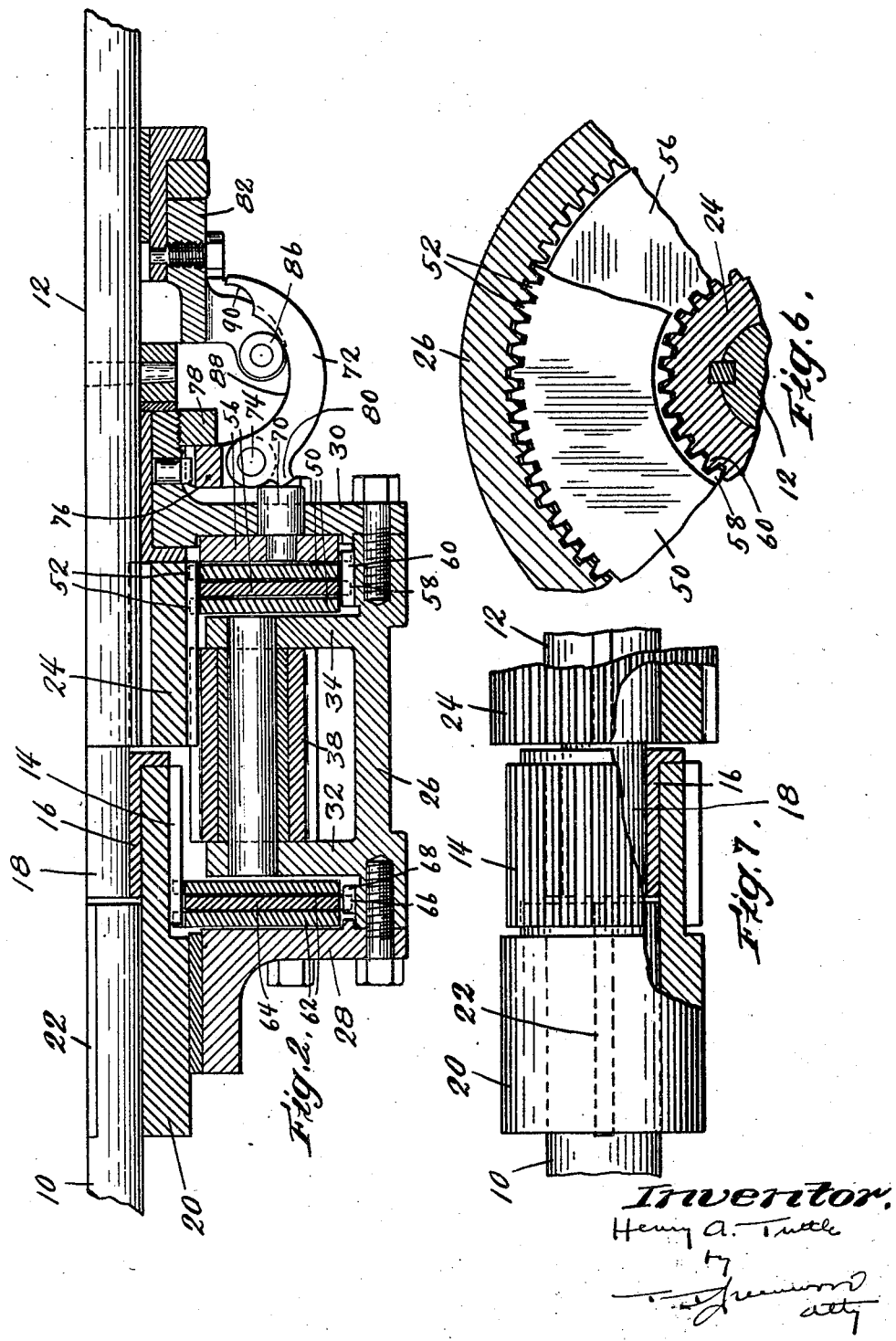
Fig. 2 is a view similar to the lower half of Fig. 1 but with the clutch mechanisms shown in disengaged condition.
Figure 3:
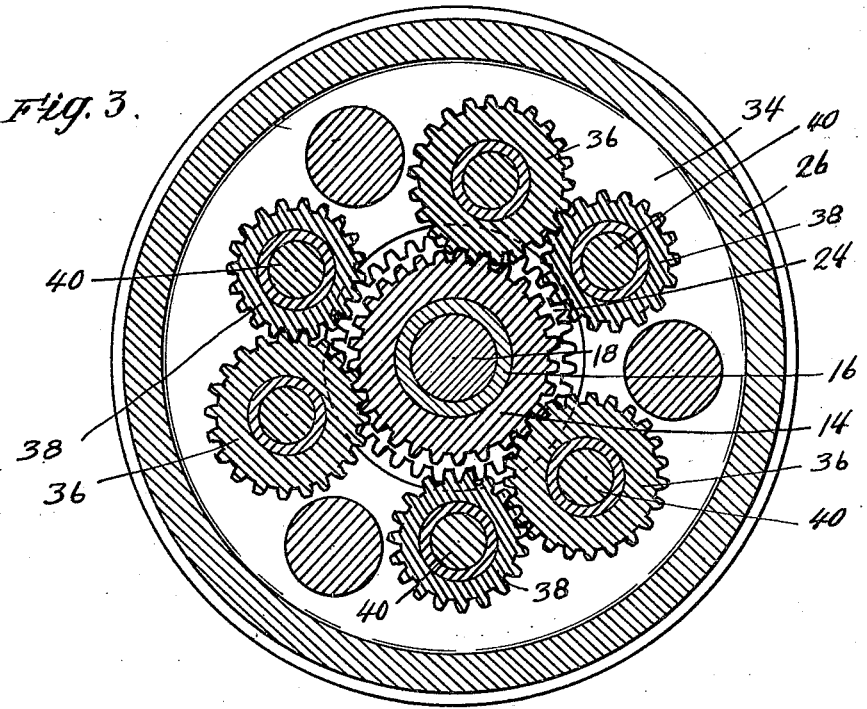
Fig. 3 is a section taken along line 3—3 of Fig. 1.
Figure 4:
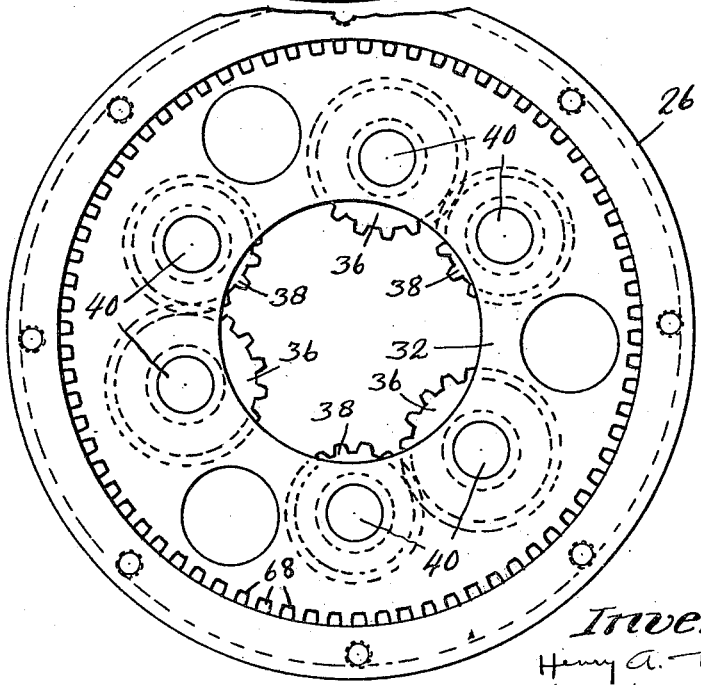
Fig. 4 is a section taken along line 4—4 of Fig. 1.

The clutch operating mechanism includes a plurality of pins 70 loosely disposed in the casing wall 30 and adapted to bear at their inner ends against the outermost one of the clutch plates 56 of the right hand section. Said pins are adapted to be moved axially toward the left to set the clutch. To this end, a plurality of arcuate-shaped levers 72 are pivoted at 74 to a ring 76 keyed onto the hub of the casing and adapted to bear against a ring 78 carried axially-adjustably on said hub. Said arms are provided with projections 80 that are adapted to engage said pins 70 and move them axially. Said arms are forced outwardly to set the clutch by means of a sleeve 82 which is slidable on the driven shaft 12. Said sleeve is provided with a plurality of outstanding arms 84 which carry rollers 86 at their ends. Said rollers are adapted to engage the inner arcuate faces 88 of said levers 72 and force them outwardly upon a movement of the sleeve 82 toward the right whereby to compress the clutch plates together and set the clutch. Fig. 2 illustrates the clutch-free condition of the mechanism while Fig. 1 illustrates the clutch set condition. In this latter condition, said rollers are adapted to enter notches 90 in the ends of said arms 88 whereby to hold the clutch in set condition. Both the clutch and the brake mechanisms are actuated by suitable actuating mechanism including the hand lever 92 common to both mechanisms and the arrangement is such that a neutral or mid position of the handle is provided wherein neither the clutch mechanism nor the brake mechanism is set and the driving and driven shafts are free from positive driving interconnection. A movement of said actuating lever on one side of the neutral position serves to set the clutch mechanism and a movement across neutral position to the other side serves to set the brake mechanism.

In further accordance with this invention, simple and reliable means are herein provided to effect the simultaneous operation of both clutch-sections of the clutch mechanisms without in any way disturbing the relation of the various gears, or complicating the gearing mechanism. To this end, a plurality of pressure pins 96 are disposed within the casing between the sets of pinion gears. Said pins are carried by the flanges or ribs 32 and 34 in parallel relation with the axes of the driving and driven shafts and are slidable in said flanges. The ends of said pins are adapted to extend in both directions beyond said flanges and to engage the innermost clutch plates of the two clutch sections. As thus arranged when the clutch operating mechanism is operated to set the clutch, pressure is applied to the right hand clutch section to move the plates axially towards the left. The innermost clutch plate bears against the right ends of the pins 96 and forces said pins towards the left. Said pins engage the innermost clutch plate of the left hand section and force the clutch plates against the casing wall 28 so that the operation of the clutch actuating mechanism serves to apply pressure simultaneously to both clutch sections and thereby to set both sections at the same time. Said pressure pins are contained entirely within and are carried by the gearing casing and so do not add any material complication to the mechanism; and they are free from driving strains that otherwise would tend to increase their frictional resistance to axial movement and oppose smooth clutching action.

I claim:

1. In a reversing mechanism, the combination of a driving shaft, a driven shaft, gearing connecting said shafts for reverse drive including a casing carrying components of said gearing, clutch mechanism connecting said shafts for forward drive including clutch-sections disposed on opposite sides of said gearing, and actuating mechanism for said clutch mechanism including pressure-transmitting means disposed within said casing independent of said gearing and interposed between said clutch-sections arranged to move one of them axially independently of corresponding movement of said gearing.

2. Reversing mechanism comprising the combination of aligned driven and driving shafts having spur gears fixed to their proximate ends, a casing rotatable about said shaft, sets of intermeshing spur gears rotatably supported by said casing and fixed against axial movement therein meshing with said spur gears, brake mechanism to hold said casing stationary to secure reverse drive, and clutch mechanism to secure forward drive, said clutch mechanism comprising separate clutch sections adapted to connect said casing with both of said shafts, each section comprising sets of cooperating clutch plates some of which are connected with said casing and others of which are connected with one or the other of said shafts, and being movable axially of said shafts, clutch operating mechanism comprising means to apply a clutch engaging pressure to one clutch section, and means slidable within the casing independently of said casing gears arranged to bear against and transmit the clutch engaging pressure to said other clutch section.

3. Gearing mechanism comprising the combination of aligned driving and driven shafts having pinion gears fixed at their proximate ends, a casing rotatable about said shafts, spaced ribs connected rigidly with and extended inwardly of said casing, sets of intermeshing pinion gears disposed between and rotatably supported by said ribs and meshing with said shaft gears, brake mechanism to hold said casing stationary for reverse drive, clutch mechanism to secure forward drive comprising clutch sections disposed on opposite sides of said ribs and arranged to clutch said casing with both of said shafts, clutch operating mechanism arranged to apply a clutch engaging pressure to one of said sections and thrust members disposed between said sets of pinion gears and having a sliding support in said ribs and a bearing engagement at their ends with said clutch sections arranged to transmit the clutch engaging pressure between said sections.

4. Reversing mechanism comprising the combination of aligned driven and driving shafts having confronting ends, a spur gear fixed to the confronting end of each shaft, a drum surrounding said shafts and spur gears and being rotatable in the aforesaid relation and fixed against axial movement, sets of meshing large and small gears journalled on said drum and each gear of the sets meshing with a separate one of said spur gears, clutches for connecting said drum with each of said shafts located within said drum and on opposite sides of said spur and pinion gears, each clutch having cooperating clutch members, one having a driving connection with the drum and the other with one of said shafts, said clutches being movable axially of said shafts into and out of clutch engaging condition, clutch operating mechanism located at one end of said drum having means arranged to move one of said clutches axially to set it, and thrust members located within said drum and movable axially thereof independently of said drum arranged to be moved axially by said first clutch into pressure-applying and clutch-setting engagement with said other clutch.

In testimony whereof, I have signed my name to this specification.

HENRY A. TUTTLE.